(No Model.)
F. H. VAN HOUTEN.
LATHE CHUCK.
No. 382,123. Patented May 1, 1888.
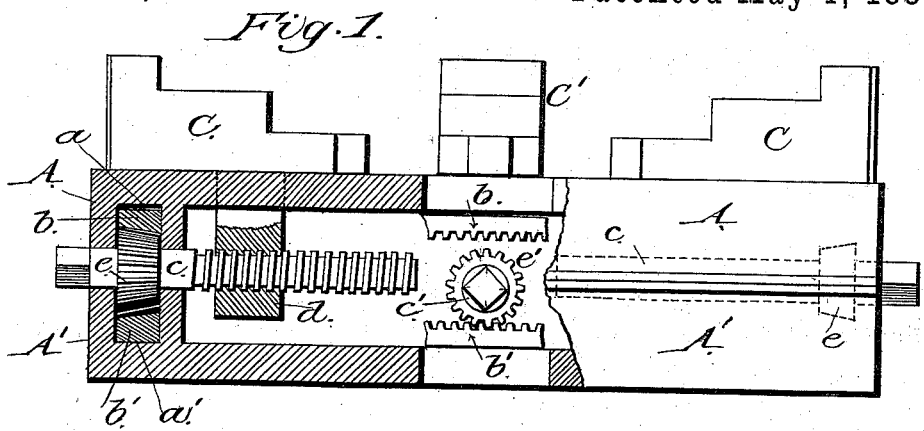
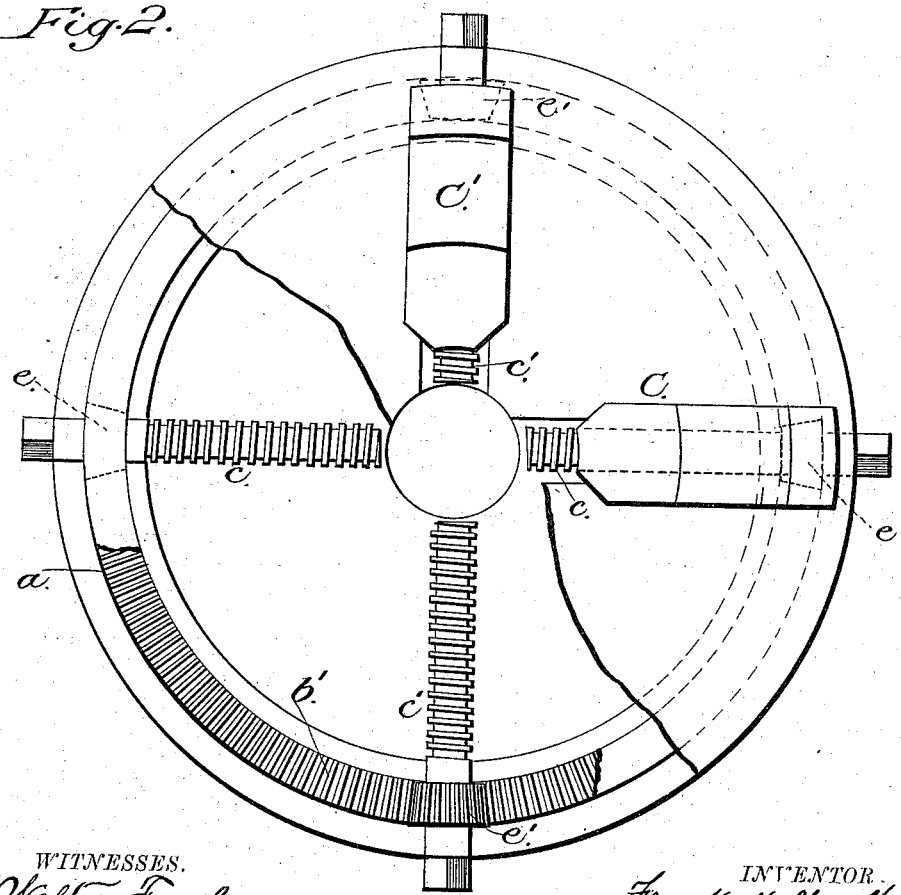
WITNESSES.
T. Walter Fowler,
W. H. Patterson
INVENTOR.
Frank H. Van Houten,
per A. H. Evans & Co.
Attorneys.

UNITED STATES PATENT OFFICE.

FRANK H. VAN HOUTEN, OF ROCHESTER, NEW YORK.

LATHE-CHUCK.

SPECIFICATION forming part of Letters Patent No. 382,123, dated May 1, 1888.

Application filed December 16, 1887. Serial No. 258,077. (No model.)

*To all whom it may concern:*

Be it known that I, FRANK H. VAN HOUTEN, a citizen of the United States, residing at Rochester, in the county of Monroe and State of New York, have invented certain new and useful Improvements in Lathe Chucks, of which the following is a full and clear description, reference being had to the accompanying drawings, in which—

Figure 1 represents a side elevation, partly in section, of a chuck embodying my invention. Fig. 2 is a plan view showing a portion of the upper shell broken away.

My invention relates to that class of lathe-chucks employing a plural series of sets of jaws; and it consists in the improved constructions and combinations of devices, which I shall hereinafter fully describe and claim.

To enable others skilled in the art to which my invention appertains to make and use the same, I will now describe its construction and indicate the manner in which the same is carried out.

In the said drawings the chuck-body is represented as being made in two parts or shells, A A', of any well-known configuration and composed of any suitable material, each shell being provided near its outer circumference with annular sockets $a$ $a'$, in which annular racks $b$ $b'$ are seated and movable in the manner common with such chucks.

In the bearings formed in each body part or shell A A', and in each side of the plane of separation of said parts, rotary shafts $c$ $c'$ are seated, said shafts having threaded inner ends engaging threaded sockets in projections $d$, extending from the jaws C C'. The shafts $c$ $c'$ are provided with pinions $e$ $e'$, which mesh with the annular racks $b$ $b'$, whereby when either shaft of the same series is turned by a wrench applied to the outer end its motion is transmitted to the other rack of that series, thereby moving the jaws C or C' in unison to bring them up against the piece of work and to hold said piece in a central position. Either of the shafts of the other series is now turned to bring the other jaws up against the work in the manner previously described, thus holding the piece of work in a true central position.

Upon reference to Fig. 1 it will be seen the shafts $c'$ are journaled in the body-piece in a plane slightly to one side of the plane of the other shafts, $c$. Therefore the pinions on said shafts $c'$ engage the rack $b'$, while the pinions on the shafts $c$ mesh with the other rack, $b$, thereby moving said rack in a direction opposite to the rotation of the other rack, and without interfering with the movement of said rack.

I am aware it is not broadly new in the construction of chucks to employ a plural number of concentric racks engaged by shafts carrying pinions, said shafts being connected with and operating jaws of different sets in alternation. I therefore do not claim such construction, broadly, as my invention.

Having thus described my invention, what I claim as new, and desire to secure by Letters Patent, is—

1. In a lathe-chuck, the jaws C C' and the shells A A', each having an annular socket, in combination with an annular rack seated in each of said sockets, the shafts $c$, having pinions engaging the rack in one of said shells, and the shafts $c'$, provided with pinions engaging the rack in the other shell, substantially as and for the purpose specified.

2. In a lathe-chuck, the jaws C C' and the shells A and A', each having an annular socket, in combination with a rack seated in one of said shells, a rack seated in the opposite shell, and a plural series of shafts journaled in different planes, the shafts of one series having pinions engaging the rack in one shell and those of the other series having pinions engaging the rack in the opposite shell, substantially as described.

FRANK H. VAN HOUTEN.

Witnesses:
J. S. GRAHAM,
JOHN KANE.